United States Patent
Lee et al.

(10) Patent No.: US 7,976,430 B2
(45) Date of Patent: Jul. 12, 2011

(54) DRIVER INTENTION DETECTION ALGORITHM FOR TRANSMISSION CONTROL

(75) Inventors: Chunhao J. Lee, Troy, MI (US); Kumaraswamy V. Hebbale, Troy, MI (US); Paul G. Otanez, Troy, MI (US); Daekyun Kim, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 752 days.

(21) Appl. No.: 12/022,712

(22) Filed: Jan. 30, 2008

(65) Prior Publication Data

US 2009/0192015 A1    Jul. 30, 2009

(51) Int. Cl.
*F16H 61/58* (2006.01)

(52) U.S. Cl. ............... 477/62; 477/65; 477/79; 477/86

(58) Field of Classification Search ............... 477/62–65, 477/79, 86
See application file for complete search history.

(56) References Cited

U.S. PATENT DOCUMENTS

| | | | | |
|---|---|---|---|---|
| 4,226,295 A | * | 10/1980 | Rembold et al. | 180/335 |
| 4,361,060 A | * | 11/1982 | Smyth | 477/78 |
| 4,669,441 A | * | 6/1987 | Okimoto | 123/559.3 |
| 4,941,556 A | * | 7/1990 | Akiyama | 477/120 |
| 5,085,301 A | * | 2/1992 | Imamura et al. | 477/169 |
| 5,143,191 A | * | 9/1992 | Nobumoto et al. | 192/76 |
| 5,411,449 A | * | 5/1995 | Takahashi et al. | 477/120 |
| 6,638,197 B2 | * | 10/2003 | Ogawa et al. | 477/174 |
| 6,655,201 B2 | * | 12/2003 | Masson et al. | 73/114.32 |

FOREIGN PATENT DOCUMENTS

| | | |
|---|---|---|
| JP | 06-221424 A | 8/1994 |
| JP | 09-144873 A | 6/1997 |
| JP | 11-182670 A | 7/1999 |
| JP | 2004-100780 A | 4/2004 |

* cited by examiner

*Primary Examiner* — Ha D. Ho
(74) *Attorney, Agent, or Firm* — John A. Miller; Miller IP Group, PLC

(57) ABSTRACT

A system and method for providing TCC control and/or transmission gear shift control by considering the rate of change of the accelerator pedal or throttle position. The method determines whether the rate of change of the throttle position exceeds a predetermined positive rate of change or a predetermined negative rate of change and, if so, releases the TCC to provide TCC control. Alternatively, or additionally, the method can provide a transmission gear down-shift or up-shift depending on which direction the throttle position is changing. Once the TCC and/or gear shift control has been initiated, the method can start a timer and then return to normal TCC and/or gear shift control after the timer has expired. The TCC and/or gear shift control can also return to normal if the rate of change of the throttle position indicates that the throttle is being returned to its previous position.

20 Claims, 3 Drawing Sheets

DRIVER INTENTION DETECTION ALGORITHM FOR TRANSMISSION CONTROL

BACKGROUND OF THE INVENTION

1. Field of the Invention

This invention relates generally to a system and method for controlling a torque converter clutch and/or transmission gear shifts in a vehicle and, more particularly, to a system and method for controlling a torque converter clutch and/or transmission gear shifts in a vehicle that includes responding to the rate of change of the accelerator pedal position.

2. Discussion of the Related Art

Internal combustion engine vehicles that employ automatic transmissions typically include a torque converter positioned between the engine and the transmission of the vehicle. A torque converter is a fluid coupling device typically including an impeller coupled to an output shaft of the engine and a turbine coupled to the input shaft of the transmission. The torque converter uses hydraulic fluid to transfer rotational energy from the impeller to the turbine. Thus, the torque converter can disengage the engine crank shaft from the transmission input shaft during vehicle idling conditions to enable the vehicle to stop and/or to shift gears.

The rotational speed of the impeller relative to the turbine in the torque converter is typically different so that there is a converter slip therebetween. Because large slips between the engine output and the transmission input significantly affect the fuel economy of the vehicle, some vehicles employ a torque converter clutch (TCC) for controlling or reducing the slip between the engine and the transmission. The TCC can also mechanically lock the impeller at the output of the engine to the turbine at the input of the transmission so that the engine and transmission rotate at the same speed. Locking the impeller to the turbine is generally only used in limited circumstances because of various implications.

Thus, a TCC generally has three modes. A fully locked mode as just described, a fully released mode and a controlled slip mode. When the TCC is fully released, the slip between the impeller and the turbine of the torque converter is only controlled by the hydraulic fluid therebetween. In the slip mode, the TCC is controlled by the pressure of hydraulic fluid in the torque converter so that the slip between the torque converter impeller and the turbine can be set so that is does not exceed a predetermined slip.

A conventional gearshift schedule for automatic transmissions is implemented in the form of shift maps. A shift map is a group of table look-up functions that define gearshift points based on vehicle speed and throttle opening. Consequently, each gearshift point defined using conventional gearshift scheduling is a function of vehicle speed and throttle opening, and does not compensate for varying vehicle conditions, such as varying vehicle loads, or road conditions, such as road grade and curvature. However, it is desirable to dynamically generate gearshift points that use a combination of inputs that compensate for varying vehicle and road conditions to achieve optimal fuel economy, performance and drivability.

Typically, the schedules for torque converter clutch apply and release and transmission gear shifts are defined by accelerator pedal position and vehicle speed in automatic transmissions. When the vehicle driver increases the accelerator pedal to a larger angle, the transmission generally responds by opening the TCC and maybe down-shifting. However, there are times when a vehicle driver steadily pushes the accelerator pedal down to compensate for road load, road gradient, etc. to provide a constant vehicle speed. There are also times when the vehicle driver wants to pass another vehicle by providing a fast pedal position increase. The transmission control sometimes does not directly follow the driver's intention, and thus, provides unwanted TCC releases and/or down-shifts or up-shifts in some of these situations. For example, when the vehicle driver is steadily increasing the accelerator pedal position to maintain a constant vehicle speed when going uphill, it may not be desirable to provide a transmission gear down-shift that may occur because of the pedal position. Also, when a vehicle driver is passing another vehicle and makes a quick accelerator pedal down change, it may be desirable to provide the transmission gear down-shift more quickly that may otherwise be provided by the pedal position and the vehicle speed.

SUMMARY OF THE INVENTION

In accordance with the teachings of the present invention, a system and method are disclosed for providing TCC control and/or transmission gear shift control by considering the rate of change of the accelerator pedal or throttle position. The method determines whether the rate of change of the throttle position exceeds a predetermined positive rate of change or a predetermined negative rate of change and, if so, releases the TCC to provide TCC control. Alternatively, or additionally, the method can provide a transmission gear down-shift or up-shift depending on which direction the throttle position is changing. Once the TCC and/or gear shift control has been initiated, the method can start a timer and then return to normal TCC and/or gear shift control after the timer has expired. The TCC and/or gear shift control can also return to normal if the rate of change of the throttle position indicates that the throttle is being returned to its previous position.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for controlling a TCC and/or transmission gear shifts in a vehicle by considering the rate of change of accelerator pedal position is merely exemplarary in nature and is no way intended to limit the invention or its applications or uses.

Figure 1:
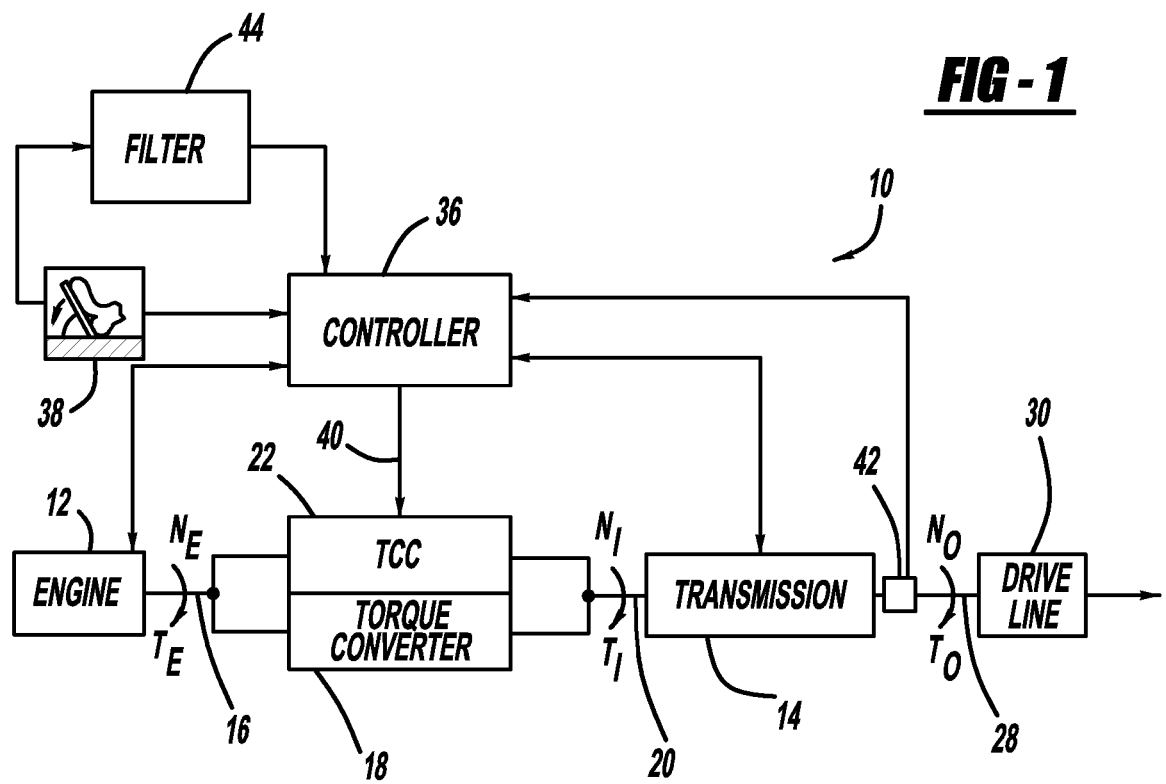
FIG. 1 is a schematic block diagram of the powertrain of a vehicle.

FIG. 1 is a block diagram of various powertrain components of a vehicle 10. The powertrain components include an engine 12 and a transmission 14. An output shaft of the engine 12, represented by line 16, is coupled to one end of a torque converter 18, and an input shaft of the transmission 16, represented by line 20, is coupled to an opposite end of the torque converter 18. As discussed above, the torque converter 18 transfers rotational energy from the engine 12 to the transmission 14 using hydraulic fluid so that the engine 12 can be disengaged from the transmission 14 when necessary. A TCC 22 sets a torque converter slip in the torque converter 18 between the engine 12 and the transmission 14, as discussed above. In this diagram, engine output power is depicted as engine rotational speed $N_E$ measured in revolutions per minutes and engine torque $T_E$ measured in Newton/meters. Likewise, the speed of the transmission 14 at its input is represented by transmission input speed $N_I$ and transmission torque $T_I$. The torque slip in the torque converter 18 is defined as $N_E$-$N_I$. An output shaft of the transmission 14, represented as line 28, is coupled to a driveline 30 of the vehicle 10 that distributes the engine power to the vehicle wheels (not shown) in a manner that is well understood to those skilled in the art. The speed of the output shaft of the transmission 14 is represented as $N_O$ and the torque of the output shaft of the transmission 14 is represented at $T_O$.

The vehicle 10 also includes powertrain controllers 36. The controllers 36 receives a throttle position signal from a vehicle throttle 38, and provides a signal to the engine 12 to provide the necessary engine speed and a signal to the transmission 14 to provide the necessary gear to satisfy the throttle demand. Additionally, depending on the selected engine speed and transmission gear, the controllers 36 provide a signal on line 40 to the TCC 22 to set the desired torque converter slip. A sensor 42 measures the rotational speed of the output shaft 28 of the transmission 14 and sends a speed signal to the controller 36 as is typical in these types of vehicles. The vehicle 10 also includes a filter 44 responsive to the position of the throttle 38 that provides a rate of change of the throttle position for reasons that will become apparent from the discussion below. In one non-limiting embodiment, the filter 44 is a Kalman filter.

Figure 2:
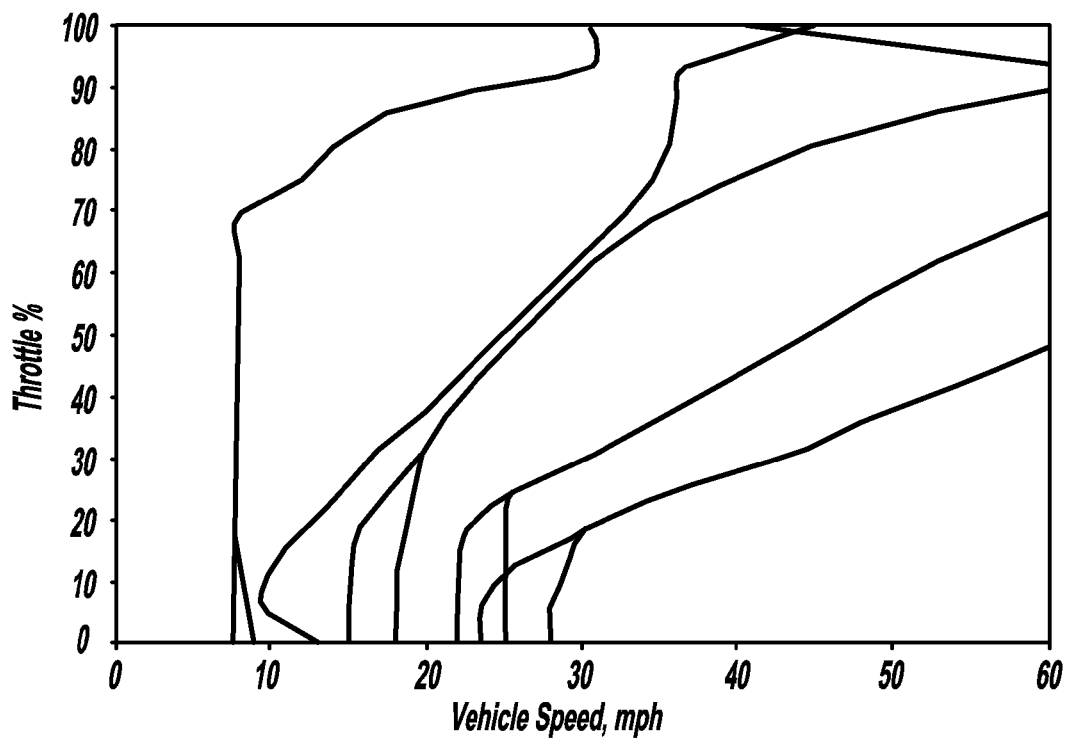
FIG. 2 is a graph showing a transmission shift schedule for a vehicle.

FIG. 2 is a graph with vehicle speed on the horizontal axis and throttle position on the vertical axis. The various graph lines show locations where a transmission gear shift occurs in response to the combined vehicle speed and throttle position. If the vehicle speed and throttle position changes at any point in time where the change causes a graph line to be crossed, then a transmission gear shift occurs depending on which gear shift that line represents.

The present invention proposes an algorithm that considers accelerator pedal and/or throttle position rate of change when determining whether to apply or release the TCC 22 or provide a transmission gear up-shift or down-shift. In one non-limiting embodiment, the rate of change is determined using a Kalman filter from the throttle/pedal position. If the rate of change is increasing and the change exceeds a predetermined threshold, the algorithm can open the TCC 22 and/or provide a gear shift. Once the TCC is open and the shift has been triggered, the algorithm can start a timer and watch to determine whether there is a corresponding follow-up decrease rate of change. Once the time has expired or the decrease rate of change meets the condition, the TCC control and/or gear shift schedule can return to normal. Thus, the present invention may provide a TCC release and/or transmission gear shift in response to throttle change before the vehicle speed and throttle position cause the transmission schedule to initiate the gear shift or TCC control so as to provide driver intent more closely.

Figure 3:
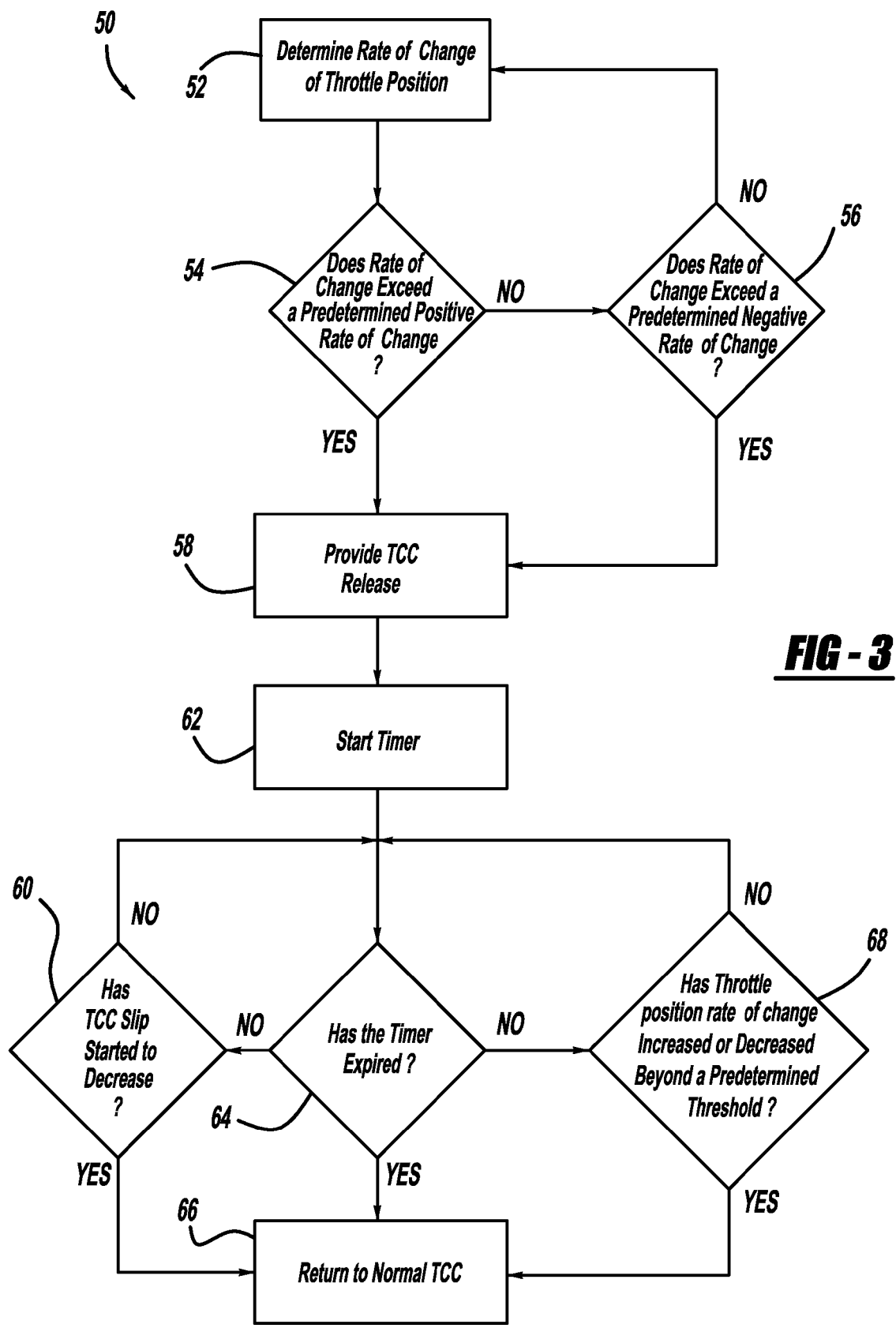
FIG. 3 is a flow chart diagram showing a process for providing TCC control in response to the rate of change of accelerator pedal position, according to an embodiment of the present invention.

FIG. 3 is a flow chart diagram 50 showing a process for providing the TCC control in response to the rate of change of the throttle position, according to an embodiment of the present invention. As will appreciated by those skilled in the art, by using this process, the TCC control may occur prior to normal TCC control so that the control is more responsive to the drivers intent.

At box 52, the algorithm determines the rate of change of the throttle position. The rate of change is an input to the controllers 36 from the filter 44. Next, the algorithm determines whether the rate of change of the throttle position exceeds a predetermined positive rate of change at decision diamond 54. At this step of the process, the algorithm is determining whether the throttle 38 is being pressed down quickly enough to initiate the control sequence of the invention. If the rate of change does not exceed the predetermined positive rate of change at the decision diamond 54, then the algorithm determines whether the rate of change of the throttle position exceeds a predetermined negative rate of change at decision diamond 56. At this step of the process, the algorithm is determining whether the vehicle operator has let up on the throttle 38 quickly, where the rate of change of the throttle position would be negative. If the rate of change does not exceed the predetermined negative rate of change at the decision diamond 56, then the algorithm returns to the box 52 to monitor the throttle position rate of change.

If either of the thresholds has been exceeded at the decision diamonds 54 and 56, meaning that the rate of change of the position of the throttle 38 is either increasing or decreasing beyond the predetermined threshold, then the algorithm initiates a TCC release at box 58. By releasing the TCC at this point in the transmission control instead of using the normal TCC release schedule, a more smooth exchange of power from the engine 12 to the transmission 14 can be provided.

If the algorithm determines that the rate of change exceeds the positive or negative rate of change thresholds at the decision diamonds 54 or 56, the algorithm can initiate a hysteresis control where the algorithm does not remove the rate of change indication until that rate of change falls below a predetermined lower value. Thus, once the rate of change does exceed the predetermined rate of change, then the condition is maintained even if the rate of change falls slightly below the predetermined rate of change.

Once the algorithm has provided the TCC release, the algorithm starts a timer at box 62, and then determines whether the timer has expired at decision diamond 64. If the timer has expired at the decision diamond 64, then the algorithm returns to the normal TCC control schedule at box 66.

If the timer has not expired at the decision diamond 64, then the algorithm determines whether the throttle position rate of change has increased or decreased beyond a predetermined threshold at decision diamond 68. At this step of the control process, depending on whether the throttle position is positive or negative, the algorithm will determine whether there is a corresponding return of the pedal position. Particularly, if the vehicle operator has quickly pressed the throttle 38, the algorithm will determine if there has been a subsequent release of the throttle 38, and if the vehicle operator has released the throttle 38, the algorithm will determine if the vehicle operator has again pressed the throttle 38. If the condition has not been met at the decision diamond 68, then the algorithm returns to the decision diamond 64 to determine whether the timer has expired. If this condition has been met at the decision diamond 68, then the algorithm returns to the normal TCC control at the box 66.

If the timer has not expired at the decision diamond 64, the algorithm can also determine whether the TCC slip has started to decrease at decision diamond 60. If this condition has not been met at the decision diamond 60, then the algorithm returns to the decision diamond 64 to determine whether the timer has expired. If this condition has been met at the decision diamond 60, then the algorithm returns to the normal TCC control at the box 66.

Figure 4:
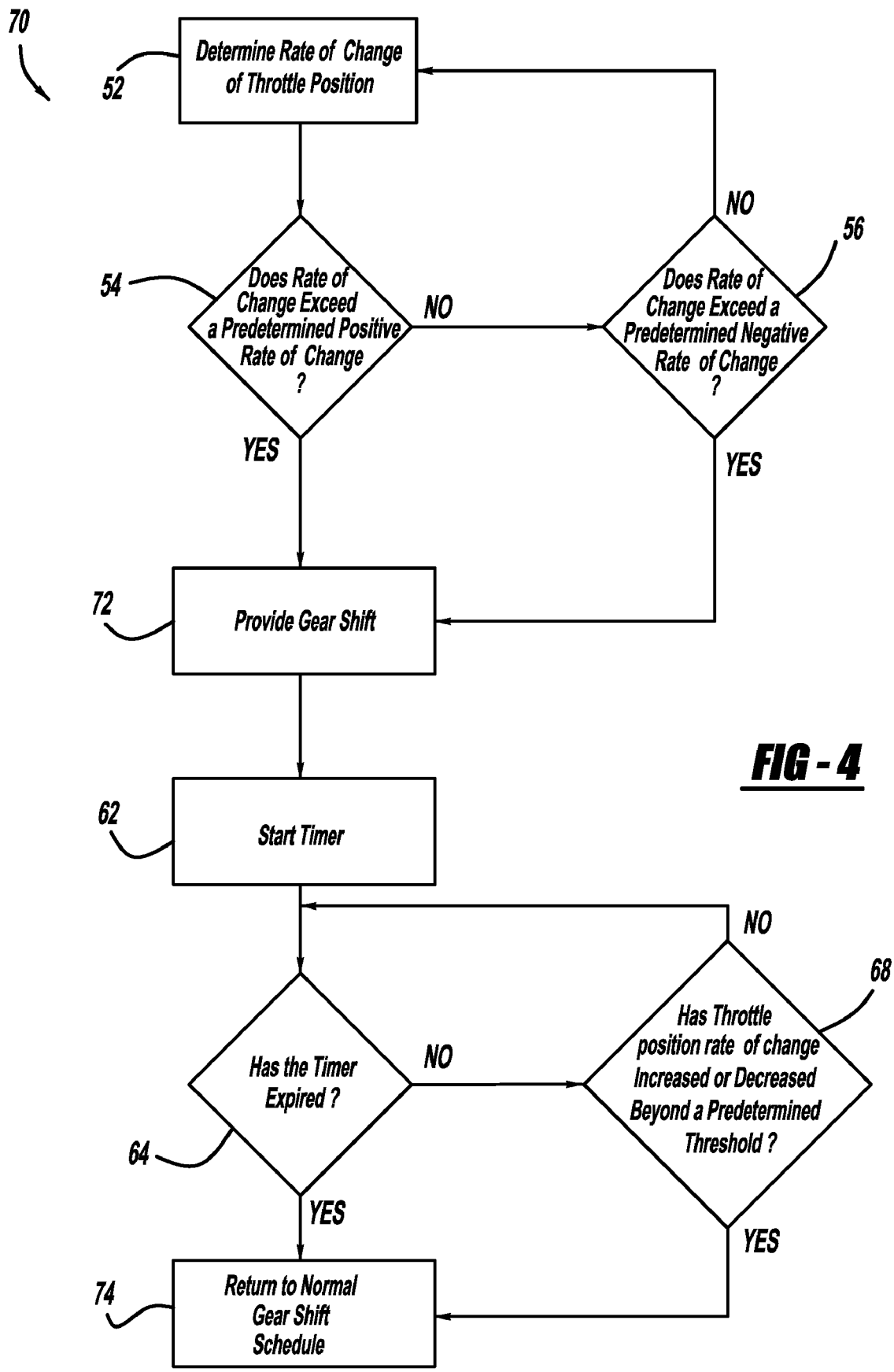
FIG. 4 is a flow chart diagram showing a process for providing transmission gear shift control in response to the rate of change of accelerator pedal position, according to an embodiment of the present invention.

FIG. 4 is a flow chart diagram 70 showing a process for providing transmission gear shift control in response to the rate of change of the throttle position, where like steps to the flow chart diagram 50 are identified by the same reference numeral, according to an embodiment of the present invention. As will appreciated by those skilled in the art, by using this process, a transmission gear shift may occur prior to the normal transmission gear shift, such as defined by the gear shift schedule shown in FIG. 2, so that the control is more responsive to the driver's intent.

The algorithm can provide a transmission gear down-shift or up-shift control at box 72. If the throttle position rate of change exceeds the predetermined positive rate change at the decision diamond 54, then the controllers 36 may want to provide a transmission gear down-shift for a lower gear position to provide the additional vehicle speed. Alternatively, if the throttle position rate of change exceeds the predetermined negative rate of change at the decision diamond 56, the controllers 36 may want to provide a transmission gear up-shift for a higher gear position if the vehicle is in a higher vehicle speed.

If the timer has expired at the decision diamond 64 or if the condition of the decision diamond 68 has been met, then the algorithm returns to a normal gear shift schedule at box 74.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for controlling a transmission in a vehicle, said method comprising:
   determining a rate of change of a throttle position of the vehicle;
   determining if the rate of change of the throttle position exceeds a predetermined positive rate of change;
   releasing a torque converter clutch if the rate of change of the throttle position does exceed the predetermined positive rate of change; and
   providing a transmission gear down-shift if the rate of change of the throttle position does exceed the predetermined positive rate of change.

2. The method according to claim 1 further comprising determining whether the rate of change of the throttle position exceeds a predetermined negative rate of change, and releasing the torque converter clutch if the rate of change of the throttle position does exceed the predetermined negative rate of change.

3. The method according to claim 2 further comprising providing a transmission gear up-shift if the rate of change of the throttle position does exceed the predetermined negative rate of change.

4. The method according to claim 1 further comprising starting a timer if the rate of change of the throttle position does exceed the predetermined positive rate of change, and returning to normal torque converter clutch control when the timer expires.

5. The method according to claim 1 further comprising determining whether the rate of change of the throttle position has decreased beyond a predetermined return threshold if the rate of change does exceed the predetermined positive rate of change, and if so, returning to a normal torque converter clutch control.

6. The method according to claim 1 further comprising determining whether a torque converter clutch slip has started to decrease if the rate of change does exceed the predetermined positive rate of change or the predetermined negative rate of change and, if so, returning to a normal torque converter clutch control.

7. The method according to claim 1 wherein determining the rate of change of the throttle position includes using a Kalman filter to provide the rate of change.

8. A method for controlling a transmission in a vehicle, said method comprising:
   determining a rate of change of a throttle position of the vehicle;
   determining if the rate of change of the throttle position exceeds a predetermined positive rate of change;
   providing a transmission gear down-shift for a lower gear position if the rate of change of throttle position does exceeds the predetermined positive rate of change; and
   determining whether the rate of change of the throttle position has decreased beyond a predetermined return threshold if the rate of change does exceed the predetermined positive rate of change, and if so, returning to a normal transmission gear shift schedule.

9. The method according to claim 8 further comprising determining whether the rate of change of the throttle position exceeds a predetermined negative rate of change, and providing a transmission gear up-shift for a higher gear position if the rate of change of the throttle position does exceed the predetermined negative rate of change.

10. The method according to claim 8 further comprising starting a timer if the rate of change of the throttle position does exceed the predetermined positive rate of change, and returning to a normal transmission gear schedule when the timer expires.

11. The method according to claim 8 wherein determining the rate of change of the throttle position includes using a Kalman filter to provide the rate of change.

12. A method for controlling a transmission in a vehicle, said method comprising:
   determining a rate of change of a throttle position of the vehicle;
   determining if the rate of change of the throttle position exceeds a predetermined positive rate of change;
   releasing a torque converter clutch if the rate of change of the throttle position does exceed the predetermined positive rate of change;
   providing a transmission gear down-shift for a lower gear position if the rate of change of the throttle position does exceed the predetermined positive rate of change;
   determining whether the rate of change of the throttle position exceeds a predetermined negative rate of change;
   releasing the torque converter clutch if the rate of change of the throttle position does exceed the predetermined negative rate of change; and
   providing a transmission gear up-shift for a higher gear position if the rate of change at the throttle position does exceed the predetermined negative rate of change.

13. The method according to claim 12 further comprising starting a timer if the rate of change of the throttle position does exceed the predetermined positive rate of change or the predetermined negative rate of change, and returning to a normal torque converter clutch control and transmission gear schedule when the timer expires.

14. The method according to claim 12 further comprising determining whether the rate of change of the throttle position has decreased beyond a predetermined return threshold if the rate of change does exceed the predetermined positive rate of change or the predetermined negative rate of change, and if so, returning to a normal torque converter clutch control and transmission gear schedule.

15. The method according to claim 12 further comprising determining whether a torque converter clutch slip has started to decrease if the rate of change does exceed the predetermined positive rate of change or the predetermined negative rate of change and, if so, returning to a normal torque converter clutch control.

16. The method according to claim 12 wherein determining the rate of change of the throttle position includes using a Kalman filter to provide the rate of change.

17. A method for controlling a transmission in a vehicle, said method comprising:
   determining a rate of change of a throttle position of the vehicle;
   determining if the rate of change of the throttle position exceeds a predetermined positive rate of change;
   determining whether the rate of change of the throttle position exceeds a predetermined negative rate of change, and releasing the torque converter clutch if the rate of change of the throttle position does exceed the predetermined negative rate of change;
   releasing a torque converter clutch if the rate of change of the throttle position does exceed the predetermined positive rate of change; and
   providing a transmission gear up-shift if the rate of change of the throttle position does exceed the predetermined negative rate of change.

18. A method for controlling a transmission in a vehicle, said method comprising:
   determining a rate of change of a throttle position of the vehicle;
   determining if the rate of change of the throttle position exceeds a predetermined positive rate of change;
   releasing a torque converter clutch if the rate of change of the throttle position does exceed the predetermined positive rate of change; and
   starting a timer if the rate of change of the throttle position does exceed the predetermined positive rate of change, and returning to normal torque converter clutch control when the timer expires.

19. A method for controlling a transmission in a vehicle, said method comprising:
   determining a rate of change of a throttle position of the vehicle;
   determining if the rate of change of the throttle position exceeds a predetermined positive rate of change;
   releasing a torque converter clutch if the rate of change of the throttle position does exceed the predetermined positive rate of change; and
   determining whether the rate of change of the throttle position has decreased beyond a predetermined return threshold if the rate of change does exceed the predetermined positive rate of change, and if so, returning to a normal torque converter clutch control.

20. A method for controlling a transmission in a vehicle, said method comprising:
   determining a rate of change of a throttle position of the vehicle;
   determining if the rate of change of the throttle position exceeds a predetermined positive rate of change;
   releasing a torque converter clutch if the rate of change of the throttle position does exceed the predetermined positive rate of change; and
   determining whether a torque converter clutch slip has started to decrease if the rate of change does exceed the predetermined positive rate of change or the predetermined negative rate of change and, if so, returning to a normal torque converter clutch control.

* * * * *